(12) United States Patent
Tweedie et al.

(10) Patent No.: US 9,684,674 B2
(45) Date of Patent: Jun. 20, 2017

(54) IMAGE DATA PROCESSING

(71) Applicant: BLACKFORD ANALYSIS LIMITED, Edinburgh (GB)

(72) Inventors: Robert John Tweedie, Edinburgh (GB); Paul Matthew Henderson, Edinburgh (GB); Benjamin David Panter, Edinburgh (GB); Peter Maxwell, Edinburgh (GB); Richard Andrew Moffett, Edinburgh (GB)

(73) Assignee: BLACKFORD ANALYSIS LIMITED, Edinburgh (GB)

( * ) Notice: Subject to any disclaimer, the term of this patent is extended or adjusted under 35 U.S.C. 154(b) by 208 days.

(21) Appl. No.: 13/855,082

(22) Filed: Apr. 2, 2013

(65) Prior Publication Data
US 2014/0297668 A1 Oct. 2, 2014

(51) Int. Cl.
*G06F 17/30* (2006.01)
(52) U.S. Cl.
CPC .................. *G06F 17/30247* (2013.01)
(58) Field of Classification Search
CPC ............. G06F 17/30244; G06F 19/321; G06T 2207/10072; G06Q 50/22
See application file for complete search history.

(56) References Cited

U.S. PATENT DOCUMENTS

| | | | |
|---|---|---|---|
| 2002/0087274 A1* | 7/2002 | Alexander et al. | 702/19 |
| 2005/0018891 A1* | 1/2005 | Barfuss et al. | 382/131 |
| 2005/0049500 A1* | 3/2005 | Babu et al. | 600/443 |
| 2005/0065423 A1* | 3/2005 | Owen | 600/407 |
| 2007/0237371 A1* | 10/2007 | Zhu et al. | 382/128 |
| 2008/0008401 A1* | 1/2008 | Zhu et al. | 382/294 |
| 2008/0118129 A1* | 5/2008 | Wegenkittl et al. | 382/131 |
| 2008/0130972 A1* | 6/2008 | Miller et al. | 382/131 |
| 2009/0148019 A1* | 6/2009 | Hamada et al. | 382/131 |
| 2012/0087557 A1* | 4/2012 | Miller et al. | 382/128 |
| 2014/0247284 A1* | 9/2014 | Gooding et al. | 345/642 |

OTHER PUBLICATIONS

NEMA, DICOM, 2011.*

* cited by examiner

*Primary Examiner* — William Spieler
(74) *Attorney, Agent, or Firm* — Saul Ewing LLP

(57) ABSTRACT

A data structure stored on a non-transitory medium includes: a first image object and a second image object, each comprising image data and series data corresponding to a series to which the image data belongs; and at least one linking object which is an instance of a linking class which is configured to provide for instantiation of linking objects which each define a link from at least one source to a target, the source corresponding to at least one of a series and a set of image data and the target corresponding solely to a series. The linking object includes target data corresponding to a target series which is other than the series to which the first and second sets of image data belong and source data corresponding to the first image data.

28 Claims, 7 Drawing Sheets

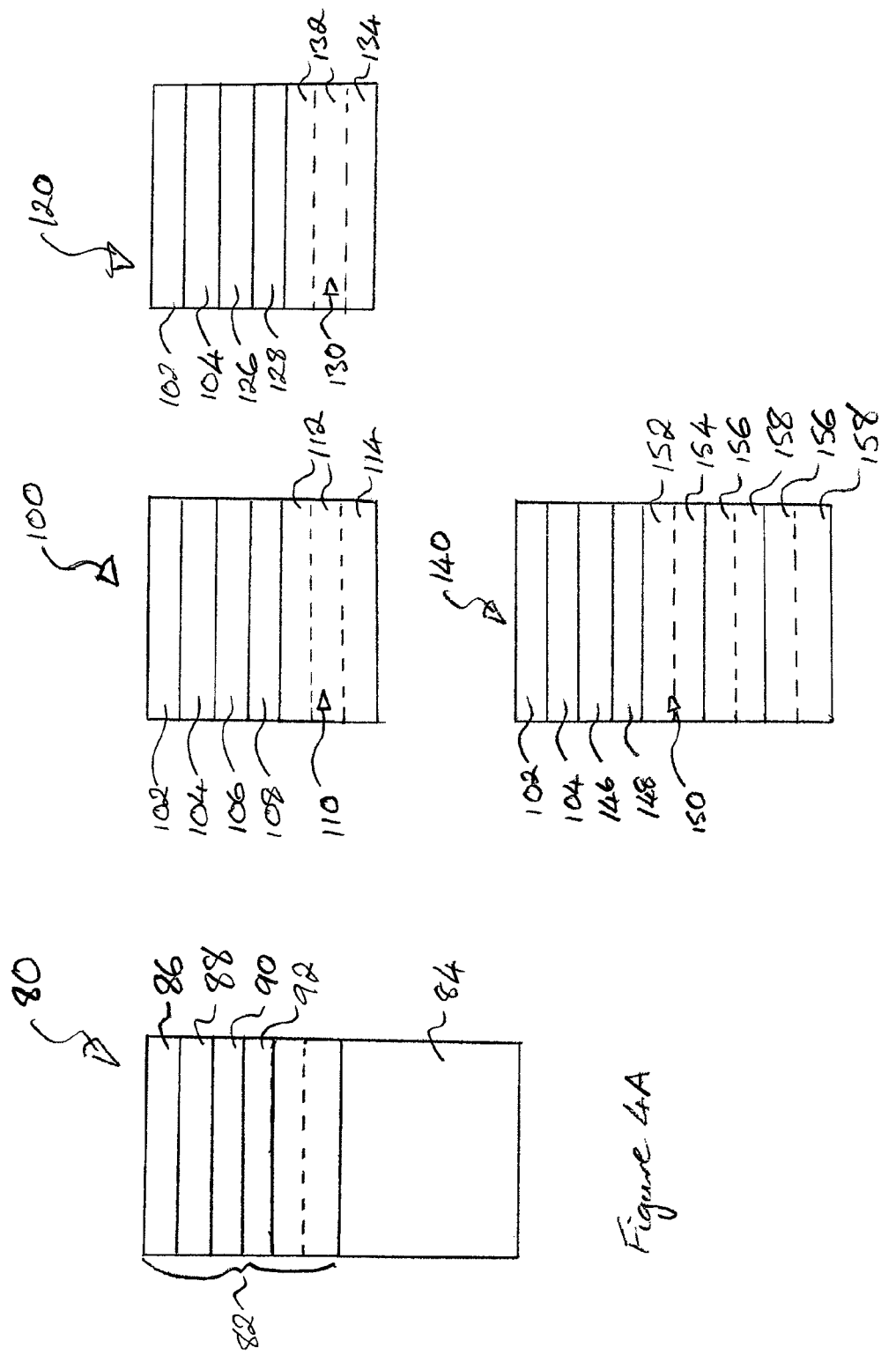

IMAGE DATA PROCESSING

FIELD OF THE INVENTION

The present invention relates to the linking of sets of image data and in particular but not exclusively to the registration of sets of image data.

BACKGROUND ART

The Digital Imaging and Communications in Medicine (DICOM) standard was created by the National Electrical Manufacturers Association (NEMA) to aid the storage, distribution and viewing of medical images, such as images acquired by Computed Tomography (CT), Magnetic Resonance Imaging (MRI) and ultrasound (US). In accordance with the DICOM standard such images are normally stored in Composite Information Object Instances. A Composite Information Object Instance is a record which in one form contains image data and a header which contains attributes of the image data, such as the patient's name, the type of scan and image dimensions. A hospital will normally acquire and store a large number of medical images for different patients and indeed sometimes for individual patients at any one time and perhaps also at different times. For example images may be acquired from a patient during a first consultation by way of plural different modalities, i.e. types of equipment, and further images may be acquired from the same patient during subsequent consultations by way of plural different modalities with the actual modalities used perhaps changing from consultation to consultation. The DICOM standard therefore provides for the storage of attributes of the acquired medical images to impart a structure to the stored medical images and thereby allow for subsequent use of the stored medical images. Such use may include transmission to and analysis at a remote location with the attributes providing for proper analysis with regards to the identification of the patient, date of acquisition, modality of acquisition and the like. Analysis might, for example, comprise the superimposition of images acquired by the same modality at different times or the superimposition of images acquired by different modalities.

FIG. 1 is a representation of DICOM compliant data structure containing medical images acquired from a patient. Medical images for the patient belong to one of two Studies with a Study comprising plural Series of Composite Information Object Instances, which each contain medical image data and which are logically related for the purpose of diagnosis. A Study is modality independent and may therefore comprise medical images that are created by a single modality, by multiple modalities or by multiple devices of the same modality. Each of the Studies in FIG. 1 comprises plural Series with each Series comprising at least one image sequence which in turn comprises at least one medical image. To meet the DICOM standard all medical images within a Series must be of the same modality. Notionally an image sequence is often considered by the skilled reader as a volume. The DICOM standard thus defines the structure of the image data. However the DICOM standard incompletely defines the separation of the image data into volumes within a Series. The introduction to the DICOM standard in 2005 of multi-frame CT, MRI and PET Objects went some way to characterising volumes by means of explicitly defined dimensions, stacks based on position and indices of temporal position. Nevertheless such recently introduced structures are still insufficient to identify when an object changes orientation within a multi-frame object, for example if a patient moves during Functional MRI. Furthermore Studies complying with pre-2005 versions of the DICOM require considerable guesswork of a receiving application in respect of available descriptive, positioning and temporal attributes of a Series to determine what images constitute a set of images, a set of single images or a volume. As an alternative to guesswork the receiving application requires knowledge of the intentions of the creator of the problematic set of images, set of single images or volume, i.e. information outside the scope of the DICOM standard.

The DICOM standard provides a Frame of Reference Information Entity which is related to at least one Series. A Frame of Reference Information Entity (IE) identifies the coordinate system that conveys spatial information of Composite Information Object Instances (i.e. medical image objects) in a Series. Frame of Reference IEs provide the ability to spatially relate multiple Series to each other. Returning to FIG. 1, the data structure 10 comprises a first Frame of Reference IE 12 which is related to Series 1 of Study 1, a second Frame of Reference IE 14 which is related to Series 2 of Study 1, a third Frame of Reference IE 16 which is related to Series 3 of Study and a fourth Frame of Reference IE 18 which is related to Series1 and Series 2 of Study 2. A Frame of Reference IE designates a Reference Coordinate System (RCS), which is the chosen origin, orientation and spatial scale of a medical image in Cartesian space. In addition the DICOM standard provides a Spatial Registration Information Object Definition (IOD) and a Deformable Spatial Registration IOD. The Spatial Registration Information Object Definition (IOD) specifies the spatial relationship in a non-deformable fashion between Frames of Reference or between at least one volume of image data and a Frame of Reference. The Spatial Registration Information Object (IO) therefore specifies the spatial relationship between a source RCS and a registered or target RCS. The Deformable Spatial Registration Information Object (IO) operates in a similar fashion but provides for a deformable spatial relationship which is achieved by way of a deformation grid and perhaps also transformation matrices. The DICOM compliant data represented in FIG. 1 comprises one Spatial Registration IO (SR1) 20 which is related to Series 2 22 of Study 2 24.

Data within a Spatial Registration IO is encoded as a series of attributes. Registration may be provided for by one of two approaches. According to the first approach the Spatial Registration IO specifies a Frame of Reference as the target in one attribute and another Frame of Reference as the source in another attribute. According to the second approach the Spatial Registration IO specifies a Frame of Reference as the target in one attribute and at least one set of image data as the source in another attribute. Irrespective of whether the first or second approach is used, the Spatial Registration IO also specifies a transformation between the source and the target in a further attribute.

Considering FIG. 1 further, if one wishes to store the transformation between Volume 1 26 of Series 1 28 of Study 1 30 and Volume 2 32 of Series 2 22 of Study 2 24 a Spatial Registration IO 20 is created having its target specified as the fourth Frame of Reference 18 which is related to Series 2 of Study 2. In addition the Spatial Registration IO 20 has its source specified either as the first Frame of Reference 12 which is related to Series 1 of Study 1 or as a reference to the image data in Volume 1 26 of Series 1 of Study 1. The desired transformation from Volume 1 of Series 1 of Study 1 to Volume 2 of Series 2 of Study 2 is specified as an attribute in the Spatial Registration IO in matrix form. The resulting Spatial Registration IO is stored with the other objects shown in FIG. 1. As can be seen from FIG. 1 there are plural Volumes in Series 2 of Study 2 and each Volume could be used to define the same transformation to the fourth Frame of Reference. Furthermore a Spatial Registration IO ($SR_j$) can be defined in respect of each of the Volumes (i.e. $V_1$, $V_2$, $V_3$) in Series 1 of Study 1 such that:

$SR_j$: $T_{1j}$, $T_{2j}$, $T_{3j}$ . . .

for each Volume in Series 1 of Study 1 where $T_{ij}$ is the transformation from Volume i of Series 1 of Study 1 to Volume j of Series 2 of Study 2.

Several issues arise from the structure of the DICOM standard as described thus far. Firstly, which of the Spatial Registration IOs (i.e. as defined above by $SR_j$) is used when one wishes to transform between an image related to the first Frame of Reference and an image related to the fourth Frame of Reference? Secondly, how does one represent a non-identity mapping between or amongst Volumes in the same Series? Thirdly, how does one represent the transformation between a Volume in one Series and an individual Volume in another Series where the other Series has multiple Volumes? The underlying problem is the DICOM standard provides for mapping between a set of images (or Volume) and a Frame of Reference with the Frame of Reference being operative at Series level and thus associated with plural Volumes within the Series. One is therefore unable to represent mapping between one Volume and another Volume.

The DICOM standard provides a structure which might be used to address this problem albeit in a fashion which creates further problems as will become apparent from the following description. The structure, however, does not make the intended purpose explicit. This means a receiving application needs to make an inference as to the intended purpose on the basis of the explicit DICOM data. Alternatively the receiving application requires knowledge of the intended purpose and thus relies on information outside the scope of the DICOM standard. Considering this DICOM structure further, volume level information may be included by way of the Common Instance Reference Module (CIR Module), which is present in all composite Information Object Definitions (IODs) and therefore in all Spatial Registration IODs. The CIR Module enables a DICOM Object to reference at least one instance of any other Object. The CIR Module can be configured to specify a target set of images whereby a Spatial Registration IO defines registration to a target Frame of Reference with the transformation being determined with respect to the set of images specified in the CIR Module.

Use of the CIR Module in the fashion described in the immediately preceding paragraph has several drawbacks. The DICOM standard does not make the presently described use of the CIR Module explicit. As mentioned above, this shortcoming could be addressed by the receiving application making an inference as to intended purpose or relying on knowledge of the intended purpose, i.e. information outside the scope of the DICOM standard. In addition the present use of the CIR Module does not provide for proper handling of multi-frame images. A multi-frame image is a DICOM Object containing multiple images which need not necessarily contain complete volumes but could instead contain partial volumes. The CIR Module does not provide for referencing of individual frames of multi-frame images with compliance with the DICOM standard allowing for referencing of either the whole or none of a multi-frame image. This shortcoming could be addressed by insertion of individual frame numbers, which is a solution, however, that fails to comply with the DICOM standard. The presently described use of the CIR Module has two further irresolvable shortcomings. Firstly where there are plural transformations to the target Frame of Reference one needs to select the appropriate one of the plural transformations for a subject image. Secondly it may in certain circumstances be difficult if not impossible to determine a required registration. The difficulty is demonstrated by reference to FIG. 2 which shows a registration tree 50 in which each circular node represents a volume and the object is to determine the registration transform from volume (a) 52 to volume (b) 54. It is straightforward to determine the registration transform where each node has its own Frame of Reference because one can check whether or not the Frames of Reference match as one moves along the branches of the registration tree. On the other hand difficulty arises if each node in FIG. 2 represents a set of images. This is because one must determine as each step is taken through the registration tree if the image sets are equal; in other words one must determine if the list of images one is looking for matches exactly the list of images found in the Spatial Registration IO (i.e. the list of images at a node in FIG. 2). Determining whether or not image sets are equal adds considerably to the computational burden. If the image sets are equal the registration transform can be determined readily enough. If, however, the image sets are not equal, e.g. an image is missing from one of the sets or there is a non-identity mapping between an image in one set and the corresponding image in the other set, one is much less readily able to determine the proper registration transform.

The present invention has been devised in the light of an appreciation of the aforementioned problems. It is therefore an object for the present invention to provide a data structure for linking a first set of image data to a second set of image data.

It is a further object for the present invention to provide an image data processor for linking a first set of image data to a second set of image data.

It is a yet further object for the present invention to provide a medium for storing data for access by an application program being executed on data processing apparatus, the medium comprising a data structure stored therein, the data structure being configured to provide for linking of one set of image data to another set of image data.

SUMMARY OF THE INVENTION

According to a first aspect of the present invention there is provided a medium for storing data for access by an application program being executed on data processing apparatus, the medium comprising a data structure stored therein, the data structure comprising:

a first image object stored in the medium, the first image object comprising a first set of image data and series data corresponding to a series to which the first set of image data belongs;

a second image object stored in the medium, the second image object comprising a second set of image data and series data corresponding to a series to which the second set of image data belongs;

at least one linking object stored in the medium, the linking object being an instance of a linking class which is configured to provide for instantiation of linking objects which each define, in use, a link from at least one source to a target, the source corresponding to at least one of a series and a set of image data and the target corresponding solely to a series, in which the at least one linking object comprises: target data corresponding to a target series which is other than the series to which the first and second sets of image data belong; first source data corresponding to the first set of image data; and second source data corresponding to the second set of image data, the at least one linking object being configured such that when the at least one linking object is operated upon by the application program a first link is established from the first set of image data to the target data and a second link is established from the second set of image data to the target data.

A known linking object, such as a DICOM compliant Spatial Registration Object, is capable of establishing a link from a set of image data or a series to a series only. More specifically known linking objects provide no means of establishing a link from a first set of image data to a second set of image data. This limitation may present no problem when a target is a series to which only one set of image data belongs whereby a link may thereby be established between a source set of image data and a target set of image data. However where plural sets of image data belong to the target series no link can be established from a source set of image data to an individual set of image data belonging to the target series. In contrast the present invention provides for establishment of a link from a source set of image data to a target set of image data. More specifically at least one linking object comprised in a data structure of the present invention comprises target data, such as a frame of reference, corresponding to a target series which is other than the series to which the first, i.e. source, set of image data and the second, i.e. target, set of image data belong. The target data may correspond to a target series unused elsewhere in the present data structure other than in linking objects configured according to the present invention. The at least one linking object also comprises first source data corresponding to the first, i.e. target, set of image data and second source data corresponding to the second, i.e. source, set of image data. The at least one linking object is configured such that when it is operated upon, e.g. parsed, by an application program, which is, for example, running in a Central Processing Unit (CPU), a first link is established from the first set of image data to the target data, e.g. frame of reference, and a second link is established from the second set of image data to the target data, e.g. frame of reference. The at least one linking object is thus configured to establish a link from the second set of image data, e.g. a source volume, to the first set of image data, e.g. target volume, by way of the first and second links.

At least one linking object according to the present invention may be operative with different forms of data structure. In one form the series data of the first and second image objects may be the same whereby the first and second sets of image data belong to the same series. The linking object may therefore, when operated upon by the application program, establish a link from a set of image data to another set of image data within the same series. In another form the series data of the first and second image objects may be different whereby the first and second sets of image data belong to different series. According to this form the data structure may further comprise at least one further image object, a further image object comprising a further set of image data and series data corresponding to the series to which the second set of image data belongs. The at least one linking object may therefore be operative to link the first set of image data to the second set of image data where the second set of image data belongs to a series comprising plural sets of image data. The data structure may further comprise plural linking objects with each linking object being configured to establish a link from at least one source set of image data to a respective target set of image data.

Establishing the first and second links by way of at least one linking object according to the invention may, for example, provide for ease of handling of sets of image data in particular where a data structure comprises a large number of image objects which perhaps belong to a large number of different series. More specifically at least one linking object according to the invention may, for example, provide for the creation of groups of sets of image data which can be selectively accessed depending on a present requirement with regards to image data processing.

The first link established by the at least one linking object is from the first set of image data to the target data and the second link established by the linking object is from the second set of image data to the target data. Establishing a link from the second set of image data to the first set of image data may, under certain circumstances, be less readily achieved in view of the first link being from the first set of image data to the target data. Navigation from the second set of image data to the first set of image data involves following the second link to the target data and then following the opposite sense of the first link to reach the first set of image data. The at least one linking object may therefore be further configured as follows to provide for ease of navigation from the second set of image data to the first set of image data.

The at least one linking object may further comprise a first source transformation which is operative when the linking object is operated upon by the application program to transform the first set of image data when the first set of image data is linked to the target data. The first source transformation may be the identity transform. An identity transform is operative to copy source data to a destination without change. The sense of the first link may therefore be readily reversed in view of the inverse of the identity transform being the identity transform to thereby provide a link from the target data to the first set of image data.

The at least one linking object may further comprise a second source transformation which is operative when the linking object is operated upon by the application program to transform the second set of image data when the second set of image data is linked to the target data. The second source transformation may, in certain forms, be an identity transform. Thus linking of the second set of image data to the first set of image data involves applying the first and second source transformations when both are the identity transform.

There may be a need to bring different sets of image data into registration or conformity with each or one another. Where, for example, the sets of image data relate to medical images, it may be necessary to bring the sets of image data into registration to provide for proper diagnosis. The second source transformation may therefore be other than the identity transform. More specifically the second source transformation may be configured to transform a set of image data without deformation. The linking object may therefore be a DICOM compliant Spatial Registration Object. The second source transformation may comprise at least one matrix which, when operated upon by the application program, is applied to a set of image data.

According to a first embodiment, the data structure may comprise first to third linking objects. The first linking object may comprise: first target data corresponding to a target series other than the series to which the first and second sets of image data belong; the first source data; and an identity transform. The second linking object may comprise: second target data corresponding to a target series other than the series to which the first and second sets of image data belong; the second source data; and an identity transform. The third linking object may comprise: the first target data; the second target data (as first source data); and a further transform. The further transform may be one of: the identity transform; and a non-identity transform. When read by an application program, the third linking object may provide the first set of image data referenced by the first linking object on account of the first target data shared by the first and third linking objects. In addition reading of the third linking object may provide the second set of image data referenced by the second linking object on account of the second target data shared by the second and third linking objects. Furthermore reading of the third linking object may provide the further transform which is operative to provide for either: a link from the second set of image data to the first set of image data where the further transform is the identity; or registration of the second set of image data with the first set of image data where the further transform is other than the identity. Where the data structure comprises at least one further image object and corresponding linking object with each corresponding linking object comprising source data corresponding to a set of image data comprised in the further image object, the third image object may comprise at least one further target data (as further source data) and corresponding transform. The third image object may therefore have a concatenated form whereby the third image object is configured to provide for linking from each of plural sets of image data to a particular target set of image data or registration of each of plural sets of image data with a particular target set of image data.

According to a second embodiment, a single linking object may comprise: the target data, which corresponds to a target series other than the series to which the first and second set of images belong; the first source data; the first transformation; the second source data; and the second transformation. As described above the first transformation may be the identity transform and the second transformation may be one of the identity transform and the non-identity transform depending on whether linking or registration is to be performed. Upon reading of the single linking object, there may be provided the first set of image data referenced by the first source data and the second set of image data referenced by the second source data. In addition there may be provided the identity transform and the second transformation which provide for either linking of the second set of image data to the first set of image data or registration of second set of image data with the first set of image data.

The single linking object may further comprise at least one further source data, each further source data corresponding to a further set of image data. The single linking object may be further configured such that when the linking object is operated upon by the application program a further link is established from a further set of image data to the target data. The further source data may be located in the linking object after the first and second source data. The linking object may be thus configured to provide for a link to be established from the first set of image data to the second set of image data and for a link to be established from each further set of image data to the second set of image data. A single linking object may thus, for example, provide for linking between each of plural source sets of image data and a particular target set of image data. Providing for linking between each of plural source sets of image data and a particular target set of image data may reduce the computation burden compared, for example, with providing for registration between different pairs of sets of image data. According to the latter approach $0.5*n*(n-1)$ registrations may be required where n is the number of sets of image data. According to the former approach $n-1$ registrations may be required where n is the number of sets of image data.

At least one of the first and second image objects and the linking object may further comprise spatial data which corresponds to at least one spatial characteristic. Where the at least one linking object comprises spatial data, such as a Frame of Reference Unique Identifier, the spatial data may be comprised in the target data. Spatial characteristics may comprise a location of an origin, e.g. within a volume of image data, a direction, e.g. left, right, up or down, a displacement with respect to an origin, and a size, e.g. of pixels within a volume of image data. The spatial data may comprise at least one spatial characteristic. The spatial data and a set of image data may therefore define where a set of image data is located. Alternatively the spatial data may comprise a spatial data identifier which is shared by other spatial data comprising at least one spatial characteristic, the other spatial data being comprised in an object other than the object comprising the spatial data. Thus an object, such as the first image object may comprise spatial data comprising at least one spatial characteristic and another object, such as the second image object, may comprise spatial data comprising a spatial data identifier for the spatial data comprised in the first image object. Where the data structure is DICOM compliant the spatial data may comprise one of a Frame of Reference Information field and a Frame of Reference Unique Identifier. Different objects may comprise different spatial data. For example the first image object may comprise spatial data which differs from spatial data comprised in the second image object. In use, the spatial data may provide for location of plural sets of image data in relation to each or one another. Where a linking object comprises at least one transformation, such as first and second transformations, the application program may be operative on the spatial data and the at least one transformation to, for example, provide for registration of plural sets of image data.

Target data comprised in the linking object may comprise target series identification data. The target series identification data may uniquely identify the target series, i.e. a series other than the series to which the first and second volumes of image data belong. Source data comprised in the linking object may comprise at least one of: spatial data corresponding to spatial data for one of the first and second image objects; and source identification data. The source identification data may uniquely identify the set of data comprised in one of the first and the second image objects. Series data comprised in an object may comprise series identification data which provides for unique identification of a particular series.

The first set of image data may comprise plural frames of image data and the at least one linking object may be configured such that the first source data corresponds to fewer than all, such as one, of the plural frames of image data comprised in the first set of image data. This is in contrast with use of a CIR Module according to the DICOM standard which does not provide for definition of an individual frame of a multi-frame image as source image data without deviating from the DICOM standard.

At least one set of image data comprised in the data structure may be medical image data, such as image data acquired from a human or animal subject. The data structure may be configured to conform to a standard for storage and handling of medical image data, such as the DICOM standard. Alternatively or in addition the application program may be configured to operate upon the data structure in accordance with a standard for storage and handling of medical image data, such as the DICOM standard. The application program may be configured to parse the linking object in accordance with a configuration of a linking class of which the linking object is an instance, the linking class being configured to provide for definition of a link from at least one source to a target, the source corresponding to at least one of a series and a volume of image data and the target corresponding solely to a series.

The first image object and the second image object may further comprise group data corresponding to a group to which a series belongs, the series corresponding to series data comprised in an image object. The group data field of image objects may be used to group plural series together such that, for example, three series belong to a first group and two series belong to a second group. The linking object may further and similarly comprise group data. Where the data structure is DICOM compliant the group data may correspond to a particular study to which a series comprising medical image data belongs.

The first image object and the second image object may further comprise subject data corresponding to a subject of image data comprised in the data structure. The subject data field of image objects may be used to identify a subject of image data comprised in the data structure. The linking object may further and similarly comprise subject data. For example and where image data comprised in the data structure is medical image data the subject data may identify a particular human or animal subject to which the medical image data relates. Where the data structure is DICOM compliant the subject data may correspond to a particular patient.

The medium may be a computer readable medium. The computer readable medium may be one of: read only memory; alterable, such as electrically alterable, memory; computer memory; and an electrical carrier signal.

The medium may be comprised in electrical apparatus, such as data processing apparatus. Therefore according to a second aspect of the present invention there is provided electronic apparatus comprising a medium according to the first aspect of the present invention. The electronic apparatus may comprise at least one of computer memory, e.g. for storing of at least one object, and a Central Processing Unit (CPU), e.g. for running of the application program.

According to a third aspect of the present invention there is provided a data structure for linking a first set of image data to a second set of image data, the data structure comprising:
  a first image object comprising a first set of image data and series data corresponding to a series to which the first set of image data belongs;
  a second image object comprising a second set of image data and series data corresponding to a series to which the second set of image data belongs;
  at least one linking object comprising: target data corresponding to a target series which is other than the series to which the first and second sets of image data belong; first source data corresponding to the first set of image data; and second source data corresponding to the second set of image data, the linking object being configured such that when the linking object is read by an application program a first link is established from the first set of image data to the target data and a second link is established from the second set of image data to the target data, the application program being configured, upon reading an instance of a linking class to which the linking object belongs, to define a link from at least one source to a target, the source corresponding to at least one of a series and a set of image data and the target corresponding solely to a series.

The data structure may be stored in a medium and more specifically a machine readable medium, such as a data carrier or memory, as described elsewhere herein. The application program may be operative on electronic apparatus, such as data processing apparatus, as described elsewhere herein. Further embodiments of the third aspect of the present invention may comprise one or more features of any previous aspect of the present invention.

According to a fourth aspect of the present invention there is provided an image data processor for linking a first set of image data to a second set of image data, the image data processor comprising:
  means operative to store a first image object comprising a first set of image data and series data corresponding to a series to which the first set of image data belongs;
  means operative to store a second image object comprising a second set of image data and series data corresponding to a series to which the second set of image data belongs;
  means operative to store at least one linking object comprising: target data corresponding to a target series which is other than the series to which the first and second sets of image data belong; first source data corresponding to the first set of image data; and second source data corresponding to the second set of image data; and
  means for reading instances of a linking class to which the linking object belongs, the linking class being configured to define a link from at least one source to a target, the source corresponding to at least one of a series and a set of image data and the target corresponding solely to a series, the linking object being configured such that when the linking object is read by the means for reading instances of a linking class a first link is established from the first set of image data to the target series and a second link is established from the second set of image data to the target series.

Embodiments of the fourth aspect of the present invention may comprise one or more features of any previous aspect of the present invention.

The present inventors have appreciated that standards for storage and handling of image data may handle certain transformations differently. For example the DICOM standard handles deformable transformations differently to non-deformable transformations. According to the DICOM standard, a deformable transformation is achieved by way of a linking object of different form to the linking object described above. More specifically a deformable transformation is achieved according to the DICOM standard by way of a Deformable Spatial Registration Object. The structure of a Deformable Spatial Registration Object differs from the structure of a Spatial Registration Object. As described above the Spatial Registration Object is capable of establishing a link from a set of image data or a series to a series only whereas the Deformable Spatial Registration Object is capable of establishing a link from a series only to either a set of image data or a series.

In a fifth aspect the present invention therefore provides a medium for storing data for access by an application program being executed on data processing apparatus, the medium comprising a data structure stored therein, the data structure comprising:
- a first image object stored in the medium, the first image object comprising a first set of image data and series data corresponding to a series to which the first set of image data belongs;
- a second image object stored in the medium, the second image object comprising a second set of image data and series data corresponding to a series to which the second set of image data belongs;
- at least one linking object stored in the medium, the linking object being an instance of a linking class which is configured to provide for instantiation of linking objects which each define, in use, a link from a source to at least one target, the source corresponding solely to a series and the target corresponding to at least one of a series and a set of image data, in which
- the at least one linking object comprises: source data corresponding to a source series which is other than the series to which the first and second sets of image data belong; first target data corresponding to the first set of image data; and second target data corresponding to the second set of image data, the linking object being configured such that when the linking object is operated upon by the application program a first link is established from the first set of image data to the source data and a second link is established from the second set of image data to the source data.

A known linking object, such as a DICOM compliant Deformable Spatial Registration Object, is capable of establishing a link from a series only to a set of image data or a series. More specifically such known linking objects provide no means of establishing a link from a first set of image data to a second set of image data. Where plural sets of image data belong to the source series no link can be established from an individual source set of image data to a target set of image data. In contrast the present invention in its fifth aspect provides for establishment of a link from a source set of image data to a target set of image data. The linking object is configured such that when it is operated upon, e.g. parsed, by an application program, which is, for example, running in a Central Processing Unit (CPU), a first link is established from the first set of image data to the source data and a second link is established from the second set of image data to the source data. The linking object is thus configured to establish a link from the first set of image data, e.g. a source volume, to the second set of image data, e.g. target volume, by way of the first and second links.

The linking object may further comprise a first target transformation which is operative when the linking object is operated upon by the application program to transform the first set of image data when the first set of image data is linked to the source data. More specifically the first target transformation may be configured to perform the identity transform. The linking object may further comprise a second target transformation. The second target transformation may be operative to perform a deformable transformation. More specifically second target transformation may comprise at least one deformable registration grid and perhaps also at least one matrix which, when operated upon by the application program, are applied to a set of image data. The linking object may therefore be a DICOM compliant Deformable Spatial Registration Object. Further embodiments of the fifth aspect of the present invention may comprise one or more features of any previous aspect of the invention. It should be noted that features of previous aspects of the present invention may need to be adapted for use with the fifth aspect in respect of the like of reversal of source data and target data as is required of Deformable Spatial Registration Objects in contrast to Spatial Registration Objects.

According to a sixth aspect of the present invention there is provided electronic apparatus comprising a medium according to the fifth aspect of the present invention. The electronic apparatus may comprise at least one of computer memory and a Central Processing Unit (CPU).

According to a seventh aspect of the present invention there is provided a data structure for linking a first set of image data to a second set of image data, the data structure comprising:
- a first image object comprising a first set of image data and series data corresponding to a series to which the first set of image data belongs;
- a second image object comprising a second set of image data and series data corresponding to a series to which the second set of image data belongs;
- at least one linking object comprising: source data corresponding to a source series which is other than the series to which the first and second sets of image data belong; first target data corresponding to the first set of image data; and second target data corresponding to the second set of image data, the linking object being configured such that when the linking object is read by an application program a first link is established from the first set of image data to the source data and a second link is established from the second set of image data to the source data, the application program being configured, upon reading an instance of a linking class to which the linking object belongs, to define a link from a source to at least one target, the source corresponding solely to a series and the target corresponding to at least one of a series and a set of image data.

According to an eighth aspect of the present invention there is provided an image data processor for linking a first set of image data to a second set of image data, the image data processor comprising:
- means operative to store a first image object comprising a first set of image data and series data corresponding to a series to which the first set of image data belongs;
- means operative to store a second image object comprising a second set of image data and series data corresponding to a series to which the second set of image data belongs;
- means operative to store at least one linking object comprising: source data corresponding to a source series which is other than the series to which the first and second sets of image data belong; first target data corresponding to the first set of image data; and second target data corresponding to the second set of image data; and
- means for reading instances of a linking class to which the linking object belongs, the linking class being configured to define a link from a source to at least one target, the source corresponding solely to a series and the target corresponding to at least one of a series and a set of image data, the linking object being configured such that when the linking object is read by the means for reading instances of a linking class a first link is established from the first set of image data to the target data and a second link is established from the second set of image data to the target data.

Embodiments of the seventh or eighth aspect of the present invention may comprise one or more features of any previous aspect of the present invention.

According to a further aspect of the present invention there is provided a medium for storing data for access by an application program being executed on data processing apparatus, the medium comprising a data structure stored therein, the data structure comprising: a first image object stored in the medium, the first image object comprising a first set of image data and series data corresponding to a series to which the first set of image data belongs; a second image object stored in the medium, the second image object comprising a second set of image data and series data corresponding to a series to which the second set of image data belongs; at least one linking object stored in the medium, the linking object being an instance of a linking class which is configured to provide for instantiation of linking objects which each define, in use, a link from at least one source to a target, in which the linking object comprises: target data corresponding to a target series; first source data corresponding to the first set of image data; and second source data corresponding to the second set of image data. Embodiments of the further aspect of the present invention may comprise one or more features of any previous aspect of the present invention.

According to a yet further aspect of the present invention there is provided a medium for storing data for access by an application program being executed on data processing apparatus, the medium comprising a data structure stored therein, the data structure comprising: a first image object stored in the medium, the first image object comprising a first set of image data and series data corresponding to a series to which the first set of image data belongs; a second image object stored in the medium, the second image object comprising a second set of image data and series data corresponding to a series to which the second set of image data belongs; at least one linking object stored in the medium, the linking object being an instance of a linking class which is configured to provide for instantiation of linking objects which each define, in use, a link from a source to at least one target, in which the linking object comprises: source data corresponding to a source series; first target data corresponding to the first set of image data; and second target data corresponding to the second set of image data. Embodiments of the further aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which:

FIG. 4A is a representation of an image object;

FIG. 4B is a representation of linking objects according to a first embodiment;

DETAILED DESCRIPTION OF THE INVENTION

Figure 1:
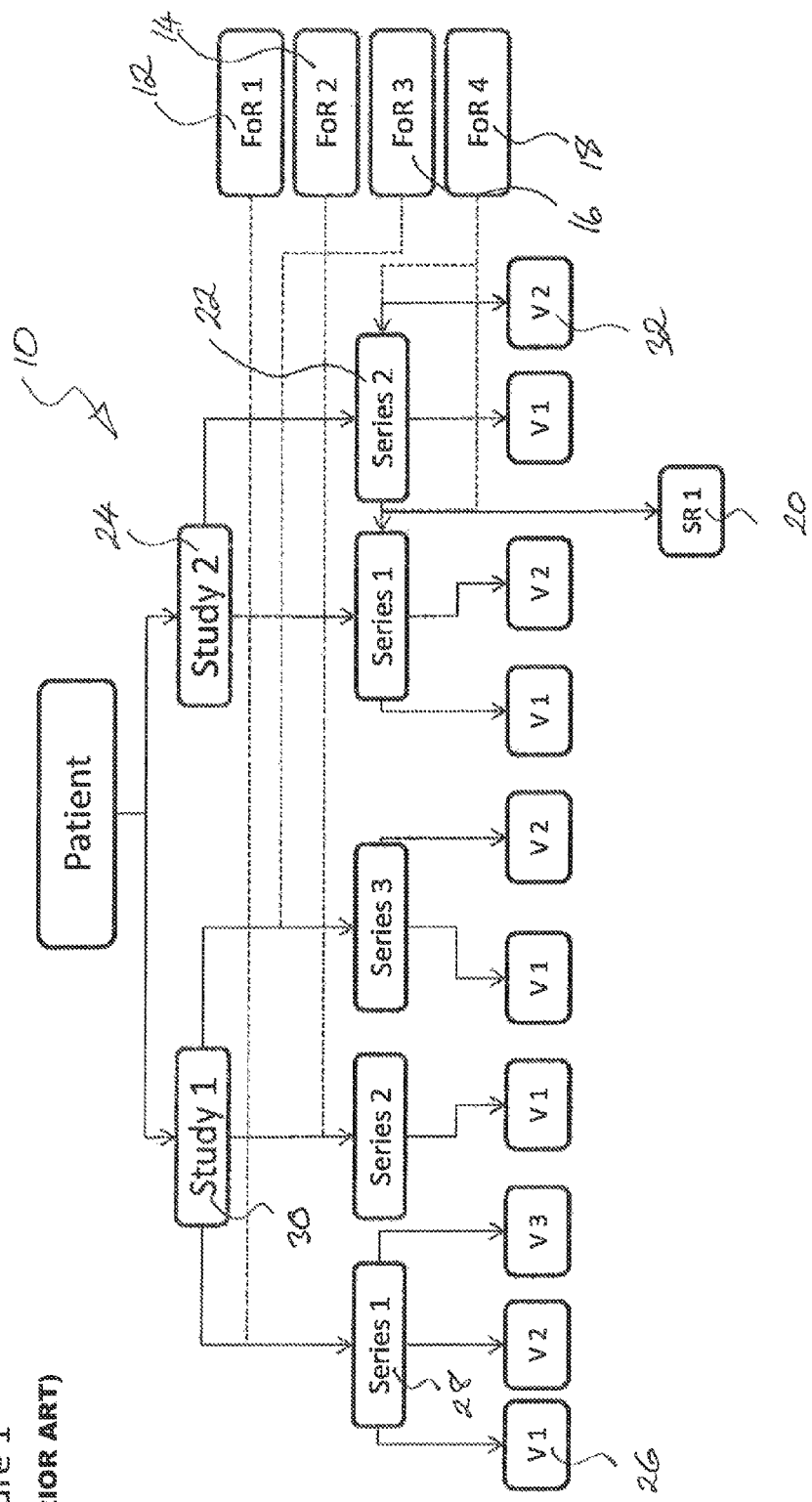
FIG. 1 is a representation of a known DICOM compliant data structure.
Figure 2:
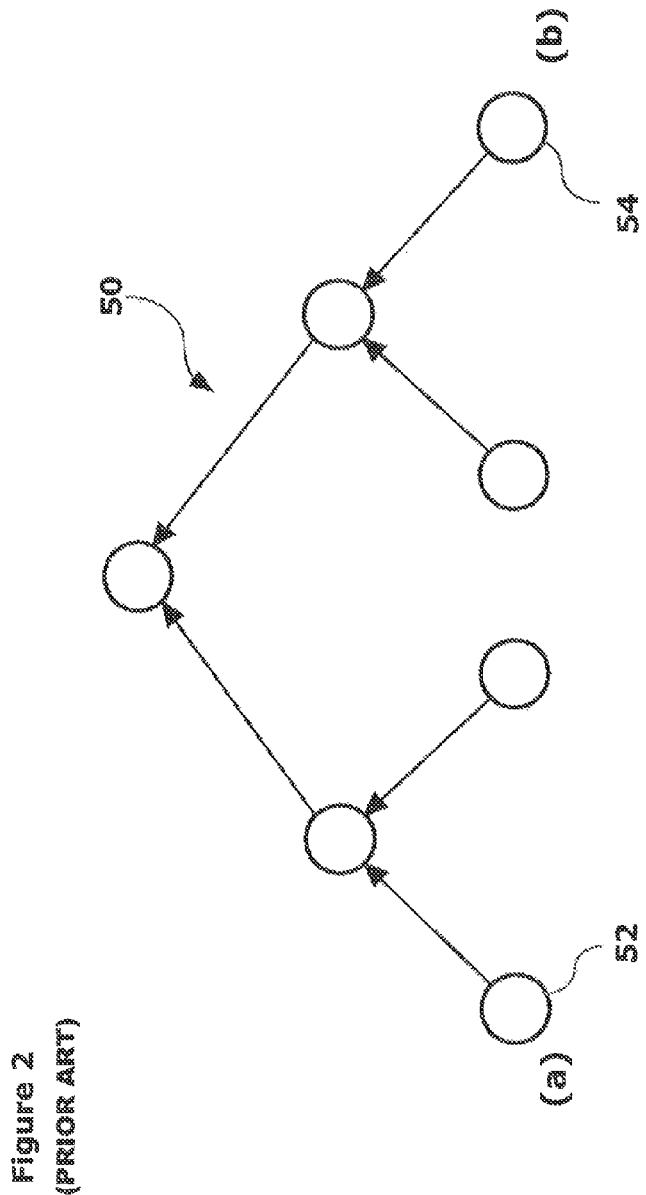
FIG. 2 is a registration tree comprising plural nodes which each represent either a volume of image data or sets of volumes of image data.

FIGS. 1 and 2 are described hereinabove in the Background Art.

The following description makes reference to the DICOM standard. The DICOM standard relates to components of data structures other than the image objects and linking objects described below. Furthermore the DICOM standard relates to application programs which are configured to read DICOM compliant data structures. The DICOM standard also relates to application programs which are configured to create DICOM compliant data structures. In view of this, the content of the DICOM standard as published by the National Electrical Manufacturers Association (NEMA) at http://medical.nema.org/standard.html, amongst other places, is incorporated herein by reference.

Figure 3:
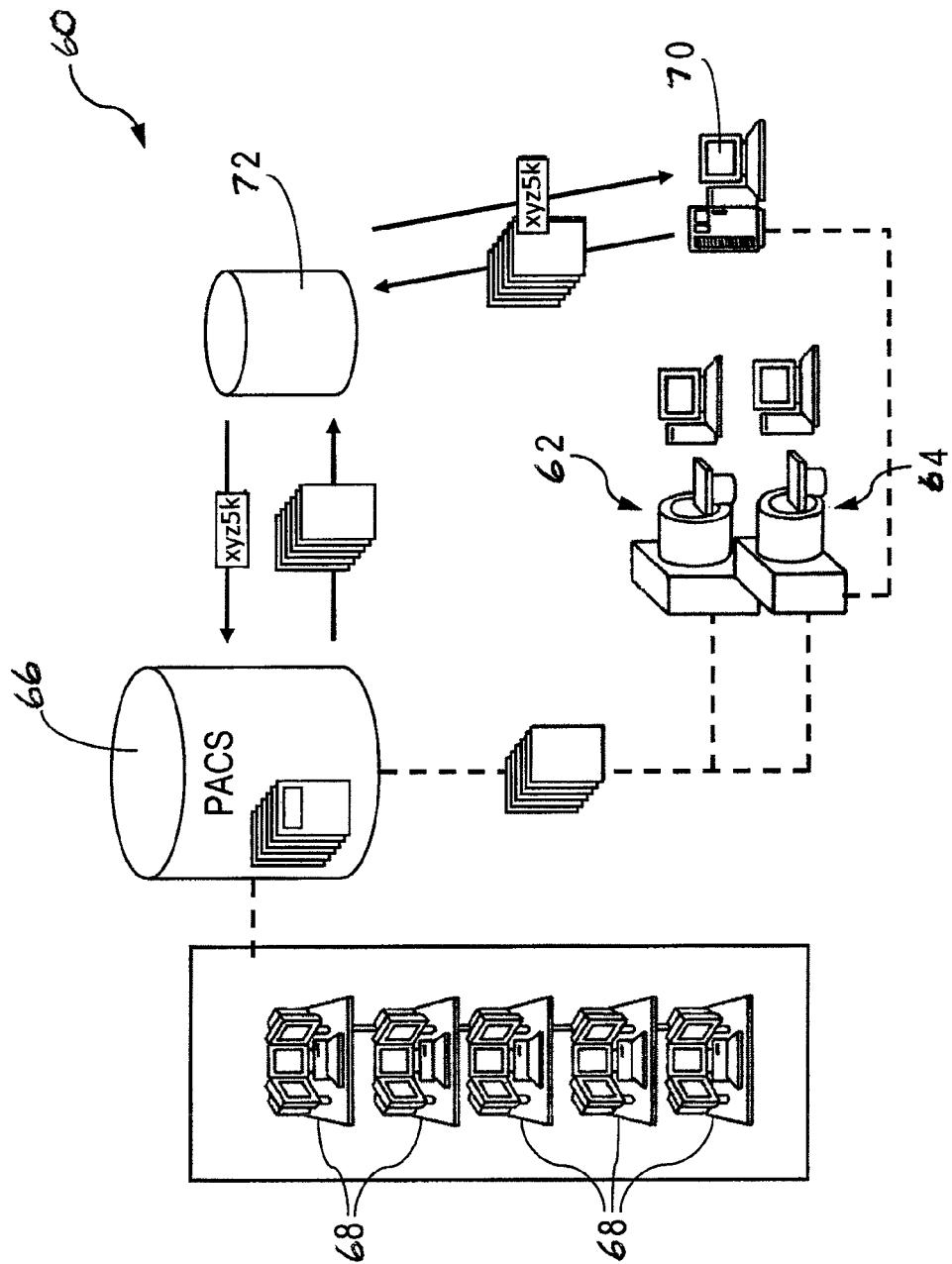
FIG. 3 is a block diagram representation of apparatus according to the present invention.

An apparatus 60 that is operable according to the present invention is shown in block diagram form in FIG. 3. The apparatus 60 comprises a Magnetic Resonance Imaging (MRI) scanner 62 and a Computed Tomography (CT) scanner 64, each of which is operable to acquire images from a part of a human or animal subject or indeed an inanimate object that is susceptible to scanning with MRI and CT scanners. The apparatus further comprises a Picture, Archiving and Communications System (PACS) apparatus 66, which stores and handles image data in a Digital Imaging and Communications in Medicine (DICOM) format, and several workstations 68 for radiologists. The workstations may be located in different locations, e.g. at different locations within the same building as the CT and MRI scanners or at locations in different buildings. Each of the workstations has a thin client architecture and is in electrical communication with the PACS apparatus 66 by way of a fast communications channel. A radiologist's workstation 70 is located adjacent the MRI and CT scanners 62, 64, with the radiologist's workstation 70 being configured to receive image data from the MRI and CT scanners 62, 64 and for analysis of received data. In addition the apparatus comprises an image processing apparatus 72, which is comprised in, associated with or located remotely from the PACS apparatus 66 and is in electrical communication with each of the PACS apparatus 66 and the radiologist's workstation 70. The image processing apparatus 72 comprises a Central Processing Unit (CPU) or Graphics Processing Unit (GPU) of well known form and associated data storage. The image processing apparatus 72 is programmed to perform the process of the present invention by program instructions of conventional form that are stored in read only memory, computer memory or on a record medium, such as an optical disc. As will become apparent from the following description FIG. 3 shows different ways in which the present invention may be practiced: firstly by way of image data communicated to the image processing apparatus 72 from the PACS apparatus 66; secondly by way of image data communicated to the image processing apparatus 72 from the radiologist's workstation 70; and thirdly by a mixture of these first and second approaches. Image data is stored in and communicated between components of the apparatus 60 of FIG. 3 in a DICOM compliant format. Elements of a DICOM compliant data structure according to the present invention are described below with reference to FIGS. 4A to 4C.

The Composite Information Object 80 of FIG. 4A (which corresponds to an image object) forms part of the present embodiment. The Composite Information Object is a DICOM compliant form of object which is used to contain image data, such as image data acquired by one or other of the MRI and CT scanners 62, 64 of FIG. 3. The Composite Information Object 80 comprises several fields or attributes 82 which define its characteristics. Fields or attributes relevant to the present invention will now be described. Details for other attributes of Composite Information Objects may be obtained by referring to the DICOM standard. The fields of present interest comprise patient identification data 86, study identification data 88 comprising a Unique Identifier (UID) for a particular study, series identification data 90 comprising a Unique Identifier (UID) for a particular series, and frame of reference identification data 92 in the form of a unique identifier for a frame of reference. The aforementioned fields can therefore be specified in each of plural Composite Information Objects to provide for formation of a hierarchical data structure of the form shown by way of example in FIG. 1 in which two studies belong to a particular patient, plural series belong to each study and at least one set of image data belongs to each series. Such a set of image data is normally regarded by the skilled person as either a volume or a set of images. It is noted, however, that the manner of storage of Composite Information Objects, for example in the PACS apparatus 66 of FIG. 3, or the order of transmission, for example between the PACS apparatus 66 and the image processing apparatus 72, has no bearing on the hierarchy in view of the hierarchy being determined on the basis of the content of the fields of the Composite Information Objects. Despite forming part of the present invention Composite Information Objects as described with reference to FIG. 4A do not differ from Composite Information Objects as configured according to known approaches.

FIG. 4B represents first 100, second 120 and third 140 Spatial Registration Information Objects (with each Object corresponding to a linking object) configured according to a first embodiment. Each of the Spatial Registration Information Objects 100, 120, 140 comprises several mandatory and optional fields or attributes. Fields or attributes relevant to the present invention will now be described. Details for other attributes of Spatial Registration Information Objects may be obtained by referring to the DICOM standard. The fields of present interest comprise patient identification data 102 and study identification data 104 comprising a Unique Identifier (UID) for a particular study. Thus far the Spatial Registration Information Object is configured and useable in accordance with known practice. Configuration for and use in the present invention is described henceforth. Considering the first Spatial Registration Information Object 100 first, the Object 100 further comprises series identification data 106 comprising a Unique Identifier (UID) for a series unused in the subject data structure; more specifically the Unique Identifier (UID) for the series is hitherto and henceforth unused elsewhere in the subject data structure other than in linking objects configured according to the invention which are cooperative in the same fashion as the first to third Spatial Registration Information Objects of FIG. 4B and as described below. The subject data structure could be extensive, such as a data structure in the like of a hospital comprising data for many patients. The first Spatial Registration Information Object 100 further comprises a target frame of reference field 108. The target frame of reference field 108 contains a Unique Identifier (UID) for a frame of reference unused in the subject data structure other than in linking objects configured according to the invention (which constitutes a link to target data). In addition the first Spatial Registration Information Object 100 comprises a source data field 110. The source data field 110 comprises source identification data in the form of UIDs identifying images 112 which thereby identifies a first volume of data comprised in at least one Composite Information Object. The source data field 110 also comprises transformation data 114 in the form of the identity transform. After data is entered into the source data field 110 data corresponding to the source data is entered into the patient and study fields 102, 104 whereby the Spatial Registration Information Object 100 is specified as belonging to the same patient and study as the source data. Parsing of the Spatial Registration Information Object 100 by an application program, such as is operative in the image processing apparatus 72, provides a source, a target and the identity transform between the source and the target.

Turning now to the second Spatial Registration Information Object 120 of FIG. 4B, the Object 120 further comprises series identification data 126 comprising a Unique Identifier (UID) for a series unused in the subject data structure; more specifically the Unique Identifier (UID) for the series is hitherto and henceforth unused elsewhere in the subject data structure other than in components according to the invention which are cooperative in the same fashion as the first to third Spatial Registration Information Objects of FIG. 4B. The second Spatial Registration Information Object 120 further comprises a target frame of reference field 128. The target frame of reference field 128 contains a Unique Identifier (UID) for a frame of reference unused in the subject data structure other than in linking objects configured according to the invention (which constitutes a link to target data). In addition the first Spatial Registration Information Object 120 comprises a source data field 130. The source data field 130 comprises source identification data in the form of a list of images 132 which thereby identifies a second volume of data comprised in at least one Composite Information Object. The source data field 130 also comprises transformation data 134 in the form of the identity transform. After data is entered into the source data field 130 data corresponding to the source data is entered into the patient and study fields 102, 104 whereby the second Spatial Registration Information Object 120 is specified as belonging to the same patient and study as the source data. Parsing of the second Spatial Registration Information Object 120 by an application program provides a source, a target and the identity transform between the source and the target, with the source and target of the present, second Spatial Registration Information Object 120 being different to those of the first Spatial Registration Information Object 100.

Turning now to the third Spatial Registration Information Object 140 of FIG. 4B, the Object 140 further comprises series identification data 146 comprising the Unique Identifier (UID) for the series specified in the first Spatial Registration Information Object 100. The third Spatial Registration Information Object 140 further comprises a target frame of reference field 148. The target frame of reference field 148 contains the Unique Identifier (UID) for the frame of reference specified in the target frame of reference field 108 of the first Spatial Registration Information Object 100. In addition the third Spatial Registration Information Object 140 comprises a source data field 150. The source data field 150 comprises source identification data 152 in the form of the Unique Identifier (UID) for the frame of reference specified in the target frame of reference field 128 of the second Spatial Registration Information Object 120. The source data field 150 also comprises transformation data 154 in the form of either: the identity transform according to a first form of the embodiment; or a transform which is operative to bring the second volume referenced by way of the second Spatial Registration Information Object 120 into registration with the first volume referenced by way of the first Spatial Registration Information Object 100 according to a second form of the embodiment. After data is entered into the source data field 150 data corresponding to the source data is entered into the patient and study fields 102, 104 whereby the third Spatial Registration Information Object 140 is specified as belonging to the same patient and study as the first Spatial Registration Information Object 120. Parsing of the third Spatial Registration Information Object 140 by an application program provides a source, a target and the transform between the source and the target, with the transform being either the identity transform or a non-identity transform. More specifically the target is provided in the form of the UID of the frame of reference specified in the target frame of reference field 108 of the first Spatial Registration Information Object 100 and the source is provided in the form of the UID of the frame of reference specified in the target frame of reference field 128 of the second Spatial Registration Information Object 120. The application program is then operative to identify the first Spatial Registration Information Object 100 in dependence on the parsed target and then to identify the first volume referenced in the first Spatial Registration Information Object 100 by way of the identity transform. In addition the application program is operative to identify the second Spatial Registration Information Object 120 in dependence on the parsed source and then to identify the second volume referenced in the second Spatial Registration Information Object 120 by way of the identity transform. The now parsed transform 154 comprised in the third Spatial Registration Information Object 140 is then applied by the application program to either: establish a link from the second volume to the first volume according to the first form of the embodiment where the parsed transform is the identity; or to bring the second volume into registration with the first volume according to the second form of the embodiment where the parsed transform is a non-identity transform. A typical data structure comprises many Spatial Registration Information Objects configured in the same fashion as the first and second Spatial Registration Information Objects 100, 120 (i.e. such that there is a Spatial Registration Information Object for each volume or set of images of interest). Linking or registration between different pairs of such Objects is achieved by way of plural different further Spatial Registration Information Objects which are each configured in the same fashion as the third Spatial Registration Information Object 140. Where a target is common to plural pairings, there is no need for individual Spatial Registration Information Objects of the form of the third Spatial Registration Information Object 140 for each target instance. Instead a concatenation approach is followed which involves an existing Spatial Registration Information Object of the form of the third Spatial Registration Information Object 140 being configured to comprise at least one further source 156 and its associated transform 158 as shown in FIG. 4B, whereby linking or registration between each of the plural sources and a particular target is achieved. The first to third Spatial Registration Information Objects 100, 120, 140 as described above provide for linking of volumes of image data on a volume to volume basis to thereby provide for improved handling of image data by an application program or for registration of image data on a volume to volume basis to thereby address limitations of known approaches in which volume to volume registration is not readily achieved or involves departing from the DICOM standard.

The aforegoing description of the first embodiment applies where a non-deformable transformation is required between a source volume and a target volume. The DICOM standard provides for deformable transformations by way of the Deformable Spatial Registration Information Object. The Deformable Spatial Registration Information Object provides for a deformable transformation which, when operated upon by an application program, is operative to provide for deformable registration of a source to a target. The Deformable Spatial Registration Information Object differs from the Spatial Registration Information Object in that the former provides for registration from a frame of reference only to a volume of image data or a frame of reference, i.e. the opposite of the latter. Deformable Spatial Registration Information Objects according to the present invention have the same configuration as the first to third Spatial Registration Information Objects 100, 120, 140 of FIG. 4B with the following exceptions which are described with reference again to FIG. 4B.

The first Deformable Spatial Registration Information Object 100 comprises a source frame of reference field 108 which contains a UID for a frame of reference unused in the subject data structure (and which constitutes a link to source data). In addition the first Deformable Spatial Registration Information Object 100 comprises a target data field 110, which comprises target identification data in the form of UIDs identifying images 112 which thereby identifies a first volume of data comprised in at least one Composite Information Object. The target data field 110 also comprises transformation data 114 in the form of the identity transform. After data is entered into the target data field 110, data corresponding to the target data is entered into the patient and study fields 102, 104 whereby the Deformable Spatial Registration Information Object 100 is specified as belonging to the same patient and study as the target data. Parsing of the Deformable Spatial Registration Information Object 100 by an application program, such as is operative in the image processing apparatus 72, provides a source, a target and the identity transform between the source and the target.

The second Deformable Spatial Registration Information Object 120 comprises a source frame of reference field 128, which contains a Unique Identifier (UID) for a frame of reference unused in the subject data structure (and which constitutes a link to source data). In addition the second Deformable Spatial Registration Information Object 120 comprises a target data field 130. The target data field 130 comprises target identification data in the form of UIDs identifying images 132 which thereby identifies a second volume of data comprised in at least one Composite Information Object. The source data field 130 also comprises transformation data 134 in the form of the identity transform. After data is entered into the source data field 130 data corresponding to the source data is entered into the patient and study fields 102, 104 whereby the second Deformable Spatial Registration Information Object 120 is specified as belonging to the same patient and study as the source data. Parsing of the second Deformable Spatial Registration Information Object 120 by an application program provides a source, a target and the identity transform between the source and the target, with the source and target of the present, second Deformable Spatial Registration Information Object 120 being different to those of the first Deformable Spatial Registration Information Object 100.

The third Deformable Spatial Registration Information Object 140 comprises series identification data 146 comprising the Unique Identifier (UID) for the series specified in the first Deformable Spatial Registration Information Object 100. The third Deformable Spatial Registration Information Object 140 further comprises a source frame of reference field 148 which contains the Unique Identifier (UID) for the frame of reference specified in the source frame of reference field 108 of the first Deformable Spatial Registration Information Object 100. In addition the third Deformable Spatial Registration Information Object 140 comprises a target data field 150. The target data field 150 comprises target identification data 152 in the form of the Unique Identifier (UID) for the frame of reference specified in the source frame of reference field 128 of the second Deformable Spatial Registration Information Object 120. The target data field 150 also comprises transformation data 154. As with the non-deformable Object, the transformation data 154 is in the form of either the identity transform or a non-identity transform. The non-identity transform is operative to bring the first volume referenced by way of the first Deformable Spatial Registration Information Object 100 into registration with the second volume referenced by way of the second Deformable Spatial Registration Information Object 120. After data is entered into the target data field 150, data corresponding to the target data is entered into the patient and study fields 102, 104 whereby the third Spatial Registration Information Object 140 is specified as belonging to the same patient and study as the first Deformable Spatial Registration Information Object 120. Parsing of the third Deformable Spatial Registration Information Object 140 by an application program provides a source, a target and the transform between the source and the target, with the transform being either the identity transform or a non-identity transform. More specifically the target is provided in the form of the UID of the frame of reference specified in the target frame of reference field 128 of the second Deformable Spatial Registration Information Object 120 and the source is provided in the form of the UID of the frame of reference specified in the target frame of reference field 108 of the first Deformable Spatial Registration Information Object 100. The application program is then operative to identify the first Deformable Spatial Registration Information Object 100 in dependence on the parsed source and then to identify the first volume referenced in the first Deformable Spatial Registration Information Object 100 by way of the identity transform. In addition the application program is operative to identify the second Deformable Spatial Registration Information Object 120 in dependence on the parsed target and then to identify the second volume referenced in the second Deformable Spatial Registration Information Object 120 by way of the identity transform. The now parsed transform 154 comprised in the third Deformable Spatial Registration Information Object 140 is then applied by the application program to either: establish a link from the first volume to the second volume where the parsed transform is the identity; or to bring the first volume into registration with the second volume where the parsed transform is a non-identity transform. As described above a typical data structure comprises many Deformable Spatial Registration Information Objects configured in the same fashion as the first and second Deformable Spatial Registration Information Objects 100, 120 (i.e. such that there is a Deformable Spatial Registration Information Object for each volume of interest). Linking or registration between different pairs of such Deformable Objects is achieved by way of plural different further Deformable Spatial Registration Information Objects which are each configured in the same fashion as the third Deformable Spatial Registration Information Object 140. Where a source is common to plural pairings, there is no need for individual Deformable Spatial Registration Information Objects of the form of the third Deformable Spatial Registration Information Object 140. Instead a concatenation approach is followed which involves an existing Deformable Spatial Registration Information Object of the form of the third Deformable Spatial Registration Information Object 140 being configured to comprise at least one further target 156 and its associated transform 158 as shown in FIG. 4B, whereby linking or registration between each of the plural targets and a particular source is achieved.

Figure 4C:
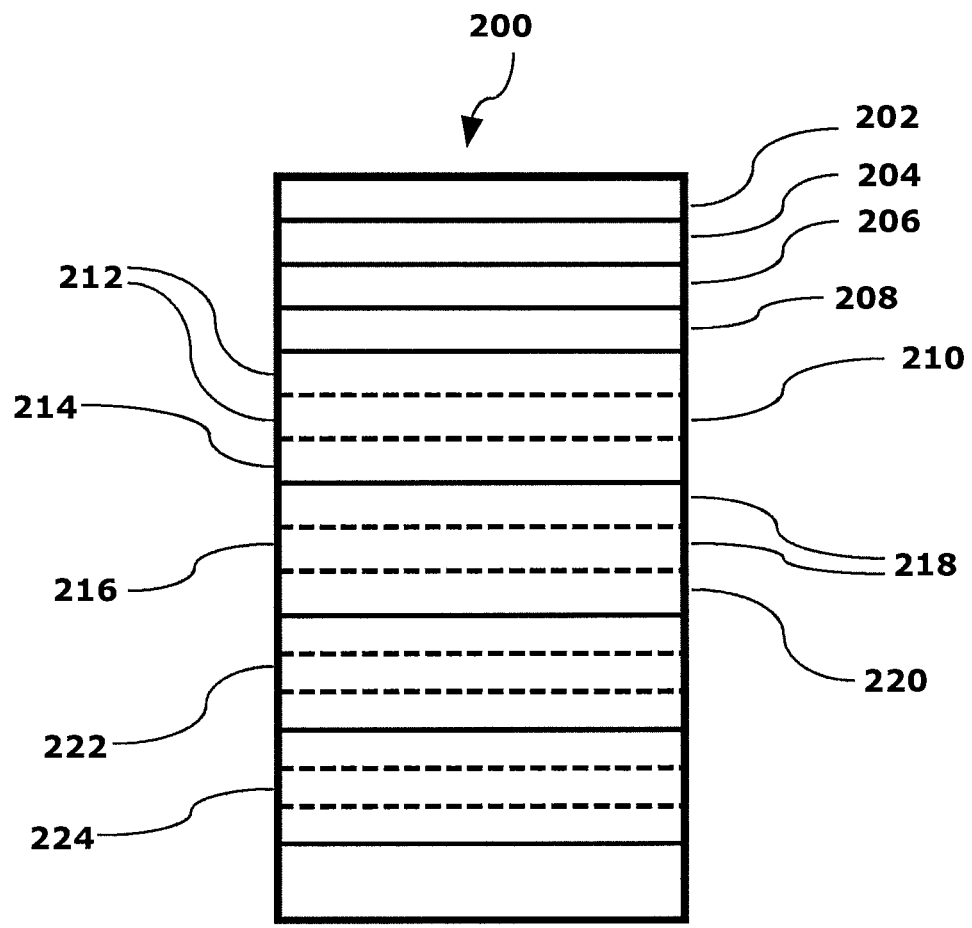
FIG. 4C is a representation of a linking object according to a second embodiment.

The invention may instead be embodied within a single Spatial Registration Information Object or a single Deformable Spatial Registration Information Object. The non-deformable form of the second embodiment will now be described with reference to FIG. 4C. FIG. 4C represents a Spatial Registration Information Object 200 (which corresponds to a linking object) according to the second embodiment. In contrast with the first embodiment, the second embodiment involves linking or registration by way of a single Spatial Registration Information Object 200. The Spatial Registration Information Object 200 comprises several mandatory and optional fields or attributes. Fields or attributes relevant to the present invention will now be described. Details for other attributes of Spatial Registration Information Objects may be obtained by referring to the DICOM standard. The fields of present interest comprise patient identification data 202 and study identification data 204 comprising a Unique Identifier (UID) for a particular study. Thus far the Spatial Registration Information Object is configured and useable in accordance with known practice. Configuration for and use in the present invention is described henceforth. The Spatial Registration Information Object 200 also comprises series identification data 206 comprising a Unique Identifier (UID) for a series unused in the subject data structure; more specifically the Unique Identifier (UID) for the series is hitherto and henceforth unused elsewhere in the subject data structure. The subject data structure could be extensive, such as a data structure in the like of a hospital comprising data for many patients. The Spatial Registration Information Object 200 further comprises a target frame of reference field 208. The target frame of reference field 208 contains a Unique Identifier (UID) for a frame of reference unused in the subject data structure (which constitutes a link to target data). In addition the Spatial Registration Information Object 200 comprises a first source data field 210. The first source data field 210 comprises source identification data in the form of UIDs identifying images 212 which thereby identifies a volume of data comprised in at least one Composite Information Object. The first source data field 210 also comprises transformation data 214 in the form of the identity transform. After data is entered into the first source data field 210 data corresponding to the first source data is entered into the patient and study fields 202, 204 whereby the Spatial Registration Information Object 200 is specified as belonging to the same patient and study as the first source data. Parsing of the Spatial Registration Information Object 200 as thus far described by an application program provides a source, a target and the identity transform between the source and the target. The Spatial Registration Information Object 200 yet further comprises a second source data field 216. The second source data field 216 comprises source identification data, which identifies a volume of data 218 comprised in at least one other Composite Information Object, and transformation data 220 in the form of either: the identity transform according to a first form of the second embodiment; or a transform which is operative to bring the volume referenced by way of the second source data field 216 into registration with the volume referenced by the first source data field 210 according to a second form of the second embodiment. Further parsing of the Spatial Registration Information Object 200 by the application program therefore provides a further source and a transform between the further source and the already parsed target. The application program is therefore able to navigate from the volume referenced by the second source data field 216 to a volume referenced by the first source data field 210 by way of the transform comprised in the second source data field 216 to the target and then by way of the inverse of the identity transform, which is the identity transform itself, from the target to the volume referenced by the first source data field 210. Where the transform comprised in the second source data field 216 is the identity transform according to the first form of the second embodiment a link is established between the volume referenced by the second source data field 216 and the target. Where the transform comprised in the second source data field 216 is the non-identity transform according to the second form of the second embodiment the non-identity transform provides for registration of the volume referenced by the second source data field 216 with the volume referenced by the first source data field 210. A single Spatial Registration Information Object 200 as described above provides for an alternative approach to linking of volumes of image data on a volume to volume basis to thereby provide for improved handling of image data by an application program or for registration of image data on a volume to volume basis to thereby address limitations of known approaches in which volume to volume registration is not readily achieved or involves departing from the DICOM standard.

Considering FIG. 4B further the Spatial Registration Information Object 200 also comprises a third source data field 222 and a fourth source data field 224 which are each configured in the same fashion as the second source data field 216. Parsing of the Spatial Registration Information Object 200 therefore yields further pairs of source volumes of image data and transformations which provide for linking or registration of each further volume of image data with the target volume of image data. A single Spatial Registration Information Object 200 can thus be configured to be operative with plural source volumes of image data subject to linking or registration being in relation to the same target. Where one has plural source volumes of image data, such as the second to fourth volumes of image data as described above, an application program can navigate between any pair of image volumes, e.g., between the third and the fourth, between the fourth and the first and between the second and the first.

The deformable form of the Spatial Registration Information Object 200 of FIG. 4C will now be described. As with the Deformable Spatial Registration Information Object according to the first embodiment, the Deformable Spatial Registration Information Object according to the second embodiment differs from the Spatial Registration Information Object in that the former provides for registration from a frame of reference only to a volume of image data or a frame of reference, i.e. the opposite of the latter. A Deformable Spatial Registration Information Object according to the second embodiment has the same configuration as the Spatial Registration Information Object 200 of FIG. 4C with the following exceptions. The Deformable Spatial Registration Information Object 200 comprises a source frame of reference field 208, which contains a UID for a frame of reference unused in the subject data structure (and which constitutes a link to source data). In addition the Deformable Spatial Registration Information Object 200 comprises a first target data field 210 which comprises target identification data in the form of a list of UIDs referencing images 212 which thereby identifies a volume of data (a first volume) comprised in at least one Composite Information Object. The first target data field 210 also comprises transformation data 214 in the form of the identity transform. After data is entered in the first target data field 210 data corresponding to the first target data is entered into the patient and study fields 202, 204 whereby the Deformable Spatial Registration Information Object 200 is specified as belonging to the same patient and study as the first target data. Parsing of the Deformable Spatial Registration Information Object 200 as thus far described by an application program provides a source, a target and the identity transform between the source and the target. The Deformable Spatial Registration Information Object 200 yet further comprises a second target data field 216. The second target data field 216 comprises target identification data, which identifies a volume of data 218 (a second volume) comprised in at least one other Composite Information Object, and transformation data 220 in the form of either: the identity transform according to a first form of the second embodiment; or a transform which is operative to bring a first volume referenced by way of the first source data field 210 into registration with a second volume referenced by the second source data field 216 according to a second form of the second embodiment. Further parsing of the Deformable Spatial Registration Information Object 200 by the application program therefore provides a further target and a transform between the further target and the already parsed source. Upon being read by an application program the Deformable Spatial Registration Information Object 200 therefore provides for navigation from the first volume via the source and the inverse of the identity transform (i.e. identity transform itself) to the second volume, with the transform associated with the second volume providing for linking when the identity and for registration when non-identity. The single Deformable Spatial Registration Information Object 200 therefore operates in the same general fashion as the Spatial Registration Information Object 200 to provide for either volume to volume linking or volume to volume registration.

Figure 5:
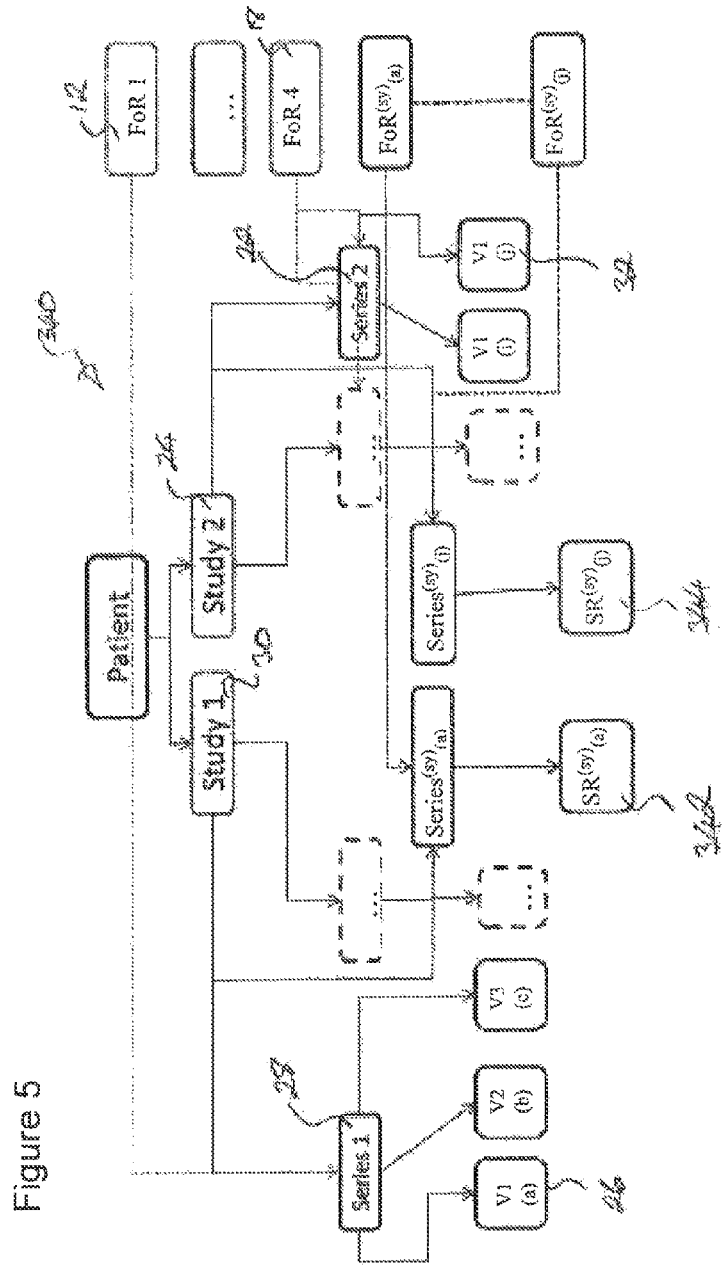
FIG. 5 is a representation of a DICOM compliant data structure according to the present invention.

A Spatial Registration Information Object or a Deformable Spatial Registration Information Object according to FIG. 4B or FIG. 4C is created for each volume of image data which is to be the target (in the non-deformable case) or the source (in the deformable case) of a linking or registration process. A data structure 340 comprising plural Spatial Registration Information Objects is shown in FIG. 5. The data structure shown in FIG. 5 is a development of the data structure shown in FIG. 1 and therefore components common to FIGS. 1 and 5 are indicated by the same reference numerals. The data structure of FIG. 5 further comprises a first plurality of Spatial Registration Information Objects ($SR^{(Sy)}_{(\alpha)}$ where $\alpha=1$ to M and M is the number of volumes in study 1) 342. Each of the first plurality of Spatial Registration Information Objects 342 is configured in accordance with the description provided above with reference to FIG. 4B or 4C to specify a different one of the volumes of image data comprised in the first Study 30 as a target or a source. The data structure of FIG. 5 also comprises a second plurality of Spatial Registration Information Objects ($SR^{(sy)}_{(\beta)}$ where $\beta=1$ to N and N is the number of volumes in study 2) 344. Likewise each of the second plurality of Spatial Registration Information Objects 344 is configured in accordance with the description provided above with reference to FIG. 4B or 4C to specify a different one of the volumes of image data comprised in the second Study 24 as a target or a source. Indeed a data structure can comprise as many Spatial Registration Information Objects and/or Deformable Spatial Registration Information Objects as are required for target or source volumes of image data. Where a particular volume of image data is to be only ever processed as a source volume there is no need to create an associated Spatial Registration Information Object in accordance with FIG. 4B or 4C. Correspondingly where a particular volume of image data is to be only ever processed as a target volume there is no need to create an associated Deformable Spatial Registration Information Object in accordance with FIG. 4B or 4C.

Where one has a data structure comprising plural Spatial Registration Information Objects 100, 200 according to FIG. 4B or 4C, an application program can navigate through the data structure by way of the Unique Identifiers (UIDs) for the frames of reference specified in the Objects. The usefulness of navigation by way of frame of reference UIDs according to the invention is illustrated by way of example by considering FIG. 2 further. Where the data structure of FIG. 2 is created by an application program according to the present invention, the set of images at each node in FIG. 2 has its own frame of reference UID provided by way of a Spatial Registration Information Object 100, 200 according to the invention. Navigation from node to node involves checking if the frame of reference UIDs in the Spatial Registration Information Objects 100, 200 according to FIG. 4B or 4C match. There is therefore no need to determine if image sets are equal (as described above) as each step is taken through the registration tree. Navigation though the data structure is therefore made much easier, e.g. for the purpose of registering two sets of images in the data structure to each other or for a housekeeping task, such as determining the size and scope of the data structure by navigating the links formed by the invention between nodes.

Figure 6B:
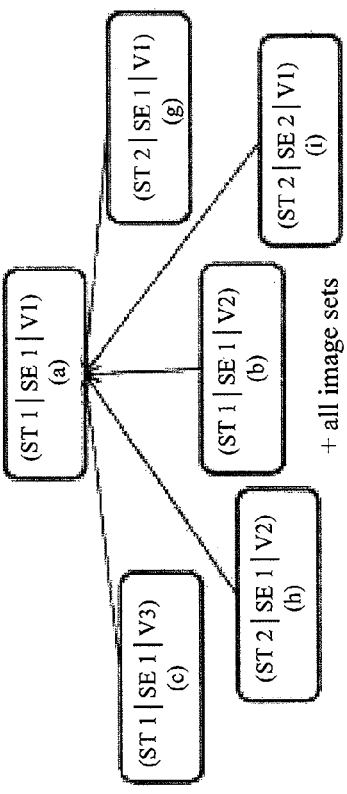
FIG. 6B represents registration amongst volumes of image data with respect to an anchor volume of image data.
Figure 6C:
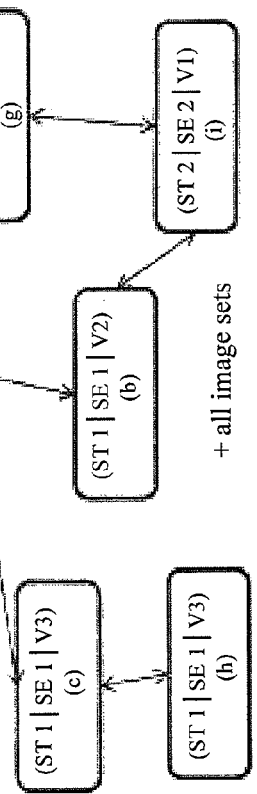
FIG. 6C represents registration between chained pairs of volumes of image data.
Figure 6A:
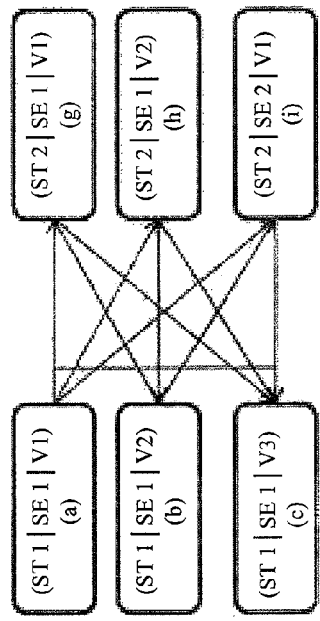
FIG. 6A represents registration between pairs of volumes of image data.

Further to providing for linking or registration between individual volumes, the present invention provides for greater flexibility as to how registrations are performed amongst plural volumes of image data. A first approach is illustrated in FIG. 6A. FIG. 6A shows all permutations of pairs of volumes of image data in a group of volumes of image data. According to this approach 0.5*n*(n−1) transformations (where n is the number of volumes of image data) need to be stored in the Spatial Registration Information Objects. A second approach is illustrated in FIG. 6B. According to the second approach all but one volume of data are each linked to the remaining volume of image data. The second approach may reduce the computational burden because only (n−1) transformations need to be stored in the Spatial Registration Information Objects linking the n−1 sources to the single target. A third approach is illustrated in FIG. 6C. According to the third approach pairs of volumes of image data are daisy chained whereby the computational burden may be reduced because only (n−1) transformations need to be stored in Spatial Registration Information Objects providing links between the pairs of volumes of image data.

The above-described steps can be implemented using standard well-known programming techniques. Software programming code which embodies the present invention is typically stored in permanent storage. In a client/server environment, such software programming code may be stored with storage associated with a server. The software programming code may be embodied on any of a variety of known non-transitory media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A non-transitory medium for storing data for access by an application program being executed on data processing apparatus, the medium comprising a data structure stored therein, the data structure comprising:
 a first image object stored in the medium, the first image object comprising a first set of related image data and first series data corresponding to a first series to which the first set of image data belongs;
 a second image object stored in the medium, the second image object comprising a second set of related image data and second series data corresponding to a second series to which the second set of image data belongs;
 at least one linking object persistently stored in the medium, the at least one linking object being an instance of a linking class which is configured to provide for instantiation of linking objects which each define, in use, a link from at least one source to a target, the at least one source corresponding to at least one of a series and a set of image data and the target corresponding solely to a series, in which
 the at least one linking object comprises: target data corresponding to a target series which is other than the first and second series to which the first and second sets of image data, respectively, belong; first source data corresponding to the first set of image data; and second source data corresponding to the second set of image data, the at least one linking object being configured such that when the at least one linking object is operated upon by the application program a first link is established from the first set of image data to the target data and a second link is established from the second set of image data to the target data, the at least one linking object further comprising a first source transformation entity which is operative when the linking object is operated upon by the application program to transform the first set of image data when the first set of image data is linked to the target data.

2. The medium according to claim 1 in which the first source transformation entity is the identity transform.

3. The medium according to claim 1, in which the at least one linking object further comprises a second source transformation entity which is operative when the linking object is operated upon by the application program to transform the second set of image data when the second set of image data is linked to the target data.

4. The medium according to claim 3, in which the second source transformation entity is the identity transform.

5. The medium according to claim 3, in which the second source transformation entity is other than the identity transform.

6. The medium according to claim 1, in which the linking object is a Spatial Registration Object.

7. The medium according to claim 1, in which the data structure comprises first to third linking objects, the first linking object comprising: first target data corresponding to a target series other than the series to which the first and second sets of image data belong; the first source data; and an identity transform, the second linking object comprising: second target data corresponding to a target series other than the series to which the first and second sets of image data belong; the second source data; and an identity transform, and the third linking object comprising: the first target data; the second target data; and a further transform.

8. The medium according to claim 7, in which the data structure comprises at least one further image object and corresponding linking object with each corresponding linking object comprising source data corresponding to a set of image data comprised in the further image object, and in which the third image object comprises at least one further target data and corresponding transform.

9. The medium according to claim 1, in which a single linking object comprises: the target data, which corresponds to a target series other than the series to which the first and second set of images belong; the first source data; the first transformation entity; the second source data; and a second transformation entity.

10. The medium according to claim 9, in which the single linking object further comprises at least one further source data, each further source data corresponding to a further set of image data, the single linking object being further configured such that when the linking object is operated upon by the application program a further link is established from a further set of image data to the target data.

11. The medium according to claim 1, in which at least one of the first and second image objects and the at least one linking object further comprise spatial data which corresponds to at least one spatial characteristic.

12. The medium according to claim 11 and where the at least one linking object comprises spatial data, in which the spatial data is comprised in the target data.

13. The medium according to claim 11 in which the spatial data comprises a spatial data identifier which is shared by other spatial data comprising at least one spatial characteristic, the other spatial data being comprised in an object other than the object comprising the spatial data.

14. The medium according to claim 11 and where the data structure is DICOM compliant, in which the spatial data comprises one of a Frame of Reference Information field and a Frame of Reference Unique Identifier.

15. The medium according to claim 1, in which source data comprised in the linking object comprises at least one of: spatial data corresponding to spatial data for one of the first and second image objects; and source identification data, the source identification data identifying the set of image data comprised in one of the first and the second image objects.

16. The medium according to claim 1, in which the first set of image data comprises plural frames of image data and the at least one linking object is configured such that the first source data corresponds to fewer than all of the plural frames of image data comprised in the first set of image data.

17. The medium according to claim 1, in which at least one set of image data comprised in the data structure is medical image data.

18. The medium according to claim 1, in which the data structure is configured to conform to a standard for storage and handling of medical image data.

19. The medium according to claim 1, in which the application program is configured to operate upon the data structure in accordance with a standard for storage and handling of medical image data.

20. The medium according to claim 1, in which the computer readable medium is one of: read only memory; alterable memory; and computer memory.

21. Electronic apparatus comprising the medium according to claim 1.

22. An image data processor for linking a first set of image data to a second set of image data, the image data processor comprising:

means operative to store a first image object comprising a first set of related image data and first series data corresponding to a series to which the first set of image data belongs;

means operative to store a second image object comprising a second set of related image data and second series data corresponding to a series to which the second set of image data belongs;

means operative to persistently store at least one linking object comprising: target data corresponding to a target series which is other than the first and second series to which the first and second sets of image data, respectively, belong; first source data corresponding to the first set of image data; second source data corresponding to the second set of image data; and a first source transformation entity; and means for reading instances of a linking class to which the at least one linking object belongs, the linking class being configured to define a link from at least one source to a target, the at least one source corresponding to at least one of a series and a set of image data and the target corresponding solely to a series, the at least one linking object being configured such that when the at least one linking object is read by the means for reading instances of a linking class a first link is established from the first set of image data to the target series, a second link is established from the second set of image data to the target series and the first source transformation entity transforms the first set of image data when the first set of image data is linked to the target data.

23. A non-transitory medium for storing data for access by an application program being executed on data processing apparatus, the medium comprising a data structure stored therein, the data structure comprising:
a first image object stored in the medium, the first image object comprising a first set of related image data and first series data corresponding to a series to which the first set of image data belongs;
a second image object stored in the medium, the second image object comprising a second set of related image data and second series data corresponding to a series to which the second set of image data belongs;
at least one linking object persistently stored in the medium, the at least one linking object being an instance of a linking class which is configured to provide for instantiation of linking objects which each define, in use, a link from a source to at least one target, the source corresponding solely to a series and the target corresponding to at least one of a series and a set of image data, in which
the at least one linking object comprises: source data corresponding to a source series which is other than the series to which the first and second sets of image data belong; first target data corresponding to the first set of image data; and second target data corresponding to the second set of image data, the at least one linking object being configured such that when the at least one linking object is operated upon by the application program a first link is established from the first set of image data to the source data and a second link is established from the second set of image data to the source data, the at least one linking object further comprising a first source transformation entity which is operative when the at least one linking object is operated upon by the application program to transform the first set of image data when the first set of image data is linked to the target data.

24. The medium according to claim 23, in which the at least one linking object further comprises a first target transformation entity which is operative when the linking object is operated upon by the application program to transform the first set of image data when the first set of image data is linked to the source data.

25. The medium according to claim 24, in which the first target transformation entity is configured to perform the identity transform.

26. The medium according to claim 23, in which at least one linking object further comprises a second target transformation entity, the second target transformation being operative to perform a deformable transformation.

27. Electronic apparatus comprising the medium according to claim 23.

28. An image data processor for linking a first set of image data to a second set of image data, the image data processor comprising:
means operative to store a first image object comprising a first set of related image data and first series data corresponding to a series to which the first set of image data belongs;
means operative to store a second image object comprising a second set of related image data and second series data corresponding to a series to which the second set of image data belongs;
means operative to persistently store at least one linking object comprising: source data corresponding to a source series which is other than the first and second series to which the first and second sets of image data, respectively, belong; first target data corresponding to the first set of image data; second target data corresponding to the second set of image data; and a first source transformation entity and
means for reading instances of a linking class to which the at least one linking object belongs, the linking class being configured to define a link from a source to at least one target, the at least one source corresponding solely to a series and the target corresponding to at least one of a series and a set of image data, the at least one linking object being configured such that when the at least one linking object is read by the means for reading instances of a linking class a first link is established from the first set of image data to the target data, a second link is established from the second set of image data to the target data and the first source transformation entity transforms the first set of image data when the first set of image data is linked to the target data.

* * * * *